United States Patent
Hedman

[19]

[11] Patent Number: 5,967,111
[45] Date of Patent: Oct. 19, 1999

[54] ARRANGEMENT IN AN OIL FILTER WITH INTEGRAL OIL COOLER

[75] Inventor: Erik Hedman, Linköping, Sweden

[73] Assignee: Purolator Products Company, Tulsa, Okla.

[21] Appl. No.: 09/046,760

[22] Filed: Mar. 24, 1998

[51] Int. Cl.[6] ............................. B01D 35/18; F01M 1/10; F01M 5/00

[52] U.S. Cl. ............................. 123/196 A; 123/196 AB; 210/184; 184/104.3; 165/119

[58] Field of Search ........................ 123/196 AB, 196 A, 123/41.31, 41.33; 210/184, 186, DIG. 17; 184/6.22, 104.3; 165/119, 154, 916

[56] References Cited

U.S. PATENT DOCUMENTS

| | | | |
|---|---|---|---|
| 1,237,722 | 8/1917 | Stanwood | 165/154 |
| 1,900,821 | 4/1933 | Kline | 210/133 |
| 5,326,461 | 7/1994 | Legrand et al. | 210/186 |
| 5,732,769 | 3/1998 | Staffa | 165/154 |

Primary Examiner—Willis R. Wolfe
Assistant Examiner—Brian Hairston
Attorney, Agent, or Firm—Fitch, Even, Tabin & Flannery

[57] ABSTRACT

The present invention relates to an arrangement in an oil filter with integral oil cooler with a filter material (7) in the form of a tubular casing, which is enclosed in a housing (1). The latter is defined by a cylindrical wall (4) and two ends (5, 6), one (5) of which can be opened for changing the filter material (7). Two essentially concentric annular circulation chambers (8, 9) are arranged in front of the cylindrical wall. Of these the one that connects with the inside of the housing (12) is intended to accommodate the flow of oil and the other which has an inlet opening (10) and an outlet opening (11) is intended to accommodate the flow of coolant. The coolant circulation chamber (8), which is the outer of the two circulation chambers, is divided by a partition wall (25) into two essentially equal sub-chambers (8a, 8b) into each of which an opening (10, 11) respectively opens. In the partition wall (25) there is a passage (19a) connecting the sub-chambers (3a, 3b), the passage being situated equidistant from the mouths (10, 11) of the inlet and outlet openings in the sub-chambers (8a, 8b), in order to obtain a symmetrical flow of coolant in the circulation chamber (8).

10 Claims, 9 Drawing Sheets

ARRANGEMENT IN AN OIL FILTER WITH INTEGRAL OIL COOLER

BACKGROUND OF THE INVENTION

The present invention relates to arrangements for oil filters with integral cooling.

Modern vehicle engines are invariably provided with oil filters for the purpose of removing particles from the oil, which form in the engine, in order to protect the bearings and other moving parts of the engine from wear.

High-performance engines also have special oil coolers in order to prevent excessively high oil temperatures, since the oil is thereby at risk of rapidly breaking down and exposure to coking with ensuing deterioration of the lubrication characteristics, which in turn results in increased engine wear and shorter engine life.

The integration of an oil filter with an oil cooler has already been proposed, for example by U.S. Pat. No. 4,831,980.

SUMMARY OF THE INVENTION

The object of the present invention is to achieve an improved function in an oil filter with integral oil cooler, and a construction that is technically easy to manufacture and thereby reduces the manufacturing cost in relation to known solution. The filter, in a manner already known in the art, also has a replaceable filter material, which is acceptable for environmental reasons.

Further details of the invention and advantages of this will be apparent from the subordinate claims and from the following description of the embodiments shown in the drawing.

BRIEF DESCRIPTION OF THE DRAWINGS

FIG. 1b is a cross-section along A—A in FIG. 1a and FIG. 1c shows, in longitudinal section, the filter part separated from the oil cooler part in an embodiment according to FIG. 1a.

FIGS. 4a, 4b show, in longitudinal and in cross-section B—B respectively, an embodiment of an intermediate wall in the oil cooler part as an alternative to the embodiment in FIG. 1a.

DETAILED DESCRIPTION OF THE PREFERRED EMBODIMENTS

Figure 1A:
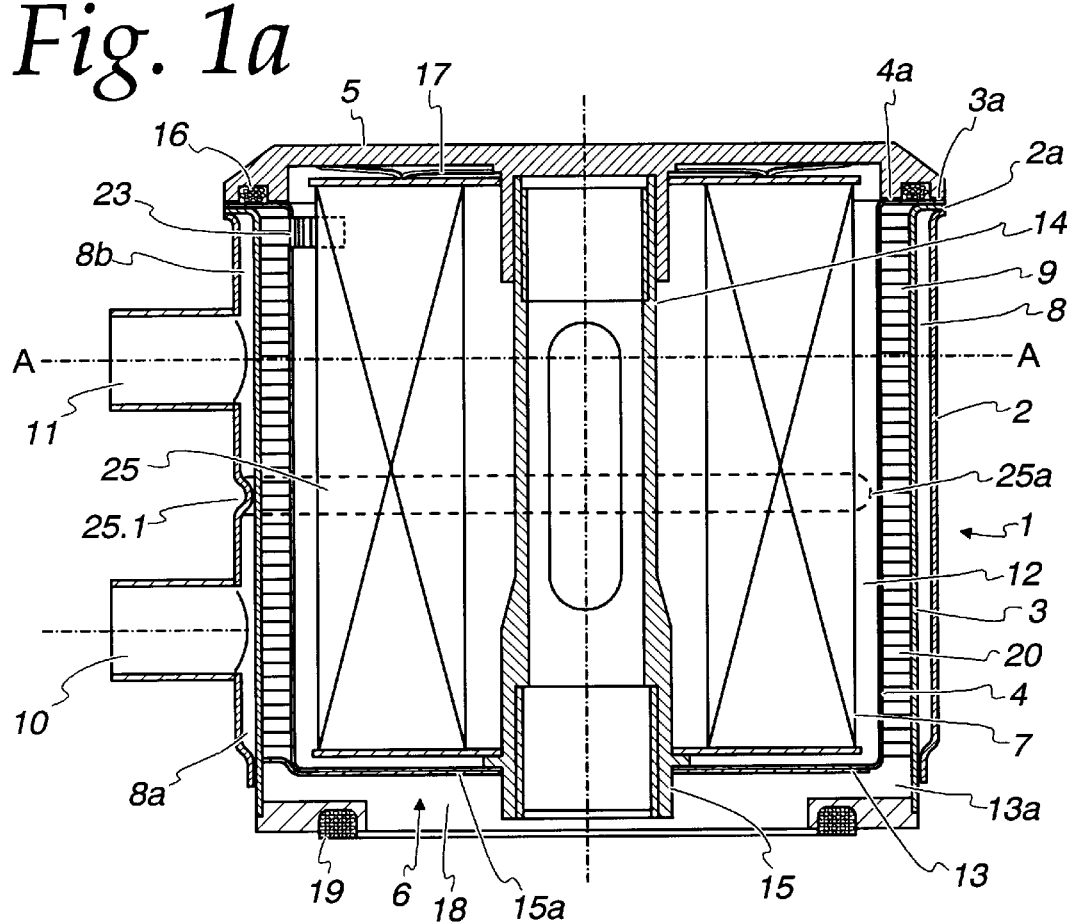
FIG. 1a shows a longitudinal section through an oil filter with integral oil cooler according to the invention.

In the drawing I generally denotes a reservoir with an outer wall 2, an intermediate wall 3 and an inner wall 4. The inner wall 4 together with two ends 5 and 6 forms a housing, which encloses a filter material 7. This is preferably composed of paper, which is folded in accordance with FIG. 1b, for example, so that it forms a tubular casing. The end 5 can be opened for changing the filter material 7 when this becomes too contaminated by impurities in the oil.

Between the outer wall 2 and the intermediate wall 3 is an outer circulation chamber 8. An inner circulation chamber 9 is defined by the intermediate wall 3 and the inner wall 4. The outer circulation chamber is intended to accommodate the flow of coolant and for this purpose has an inlet opening 10 and an outlet opening 11; the said openings, in the embodiment shown in FIG. 1a, FIG. 4a and FIG. 5, comprise connection sockets, the embodiments according to FIGS. 6a and 7a will be explained later.

The inner circulation chamber 9 which is intended to accommodate the flow of oil, connects with the inside 12 of the filter housing. The respective flow paths of the oil and coolant will be explained in connection with FIGS. 3a, 3b and 2a, 2b.

Figure 1B:
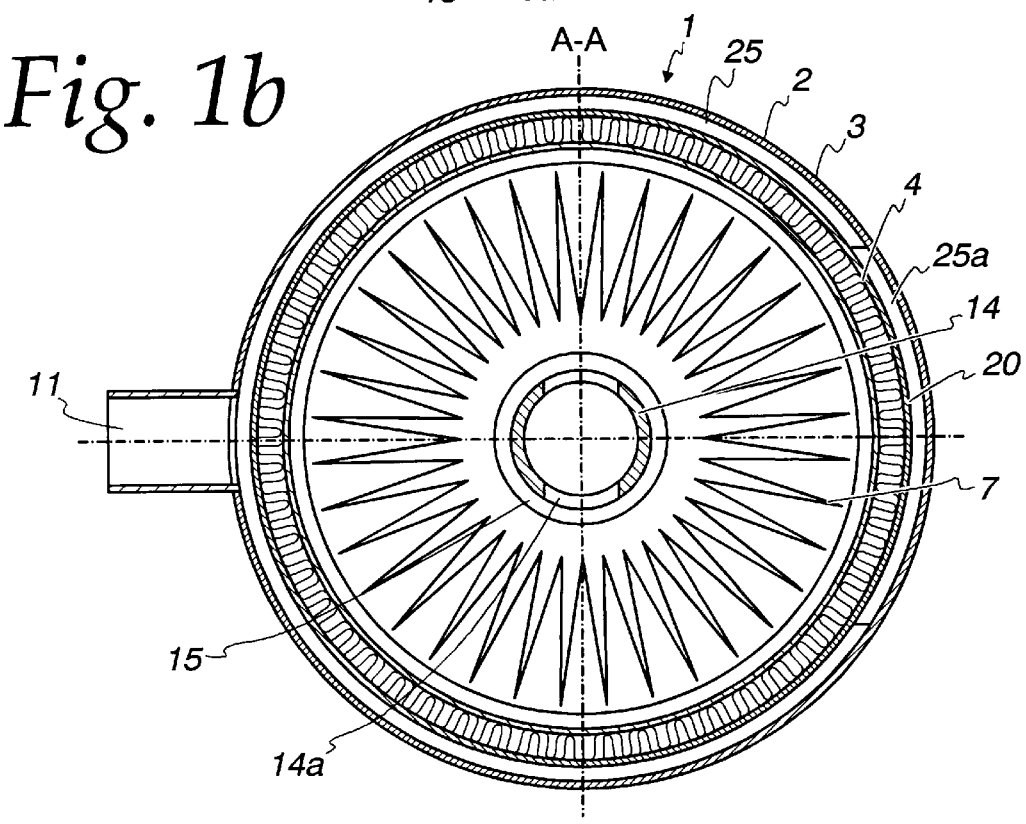
Figure 1C:
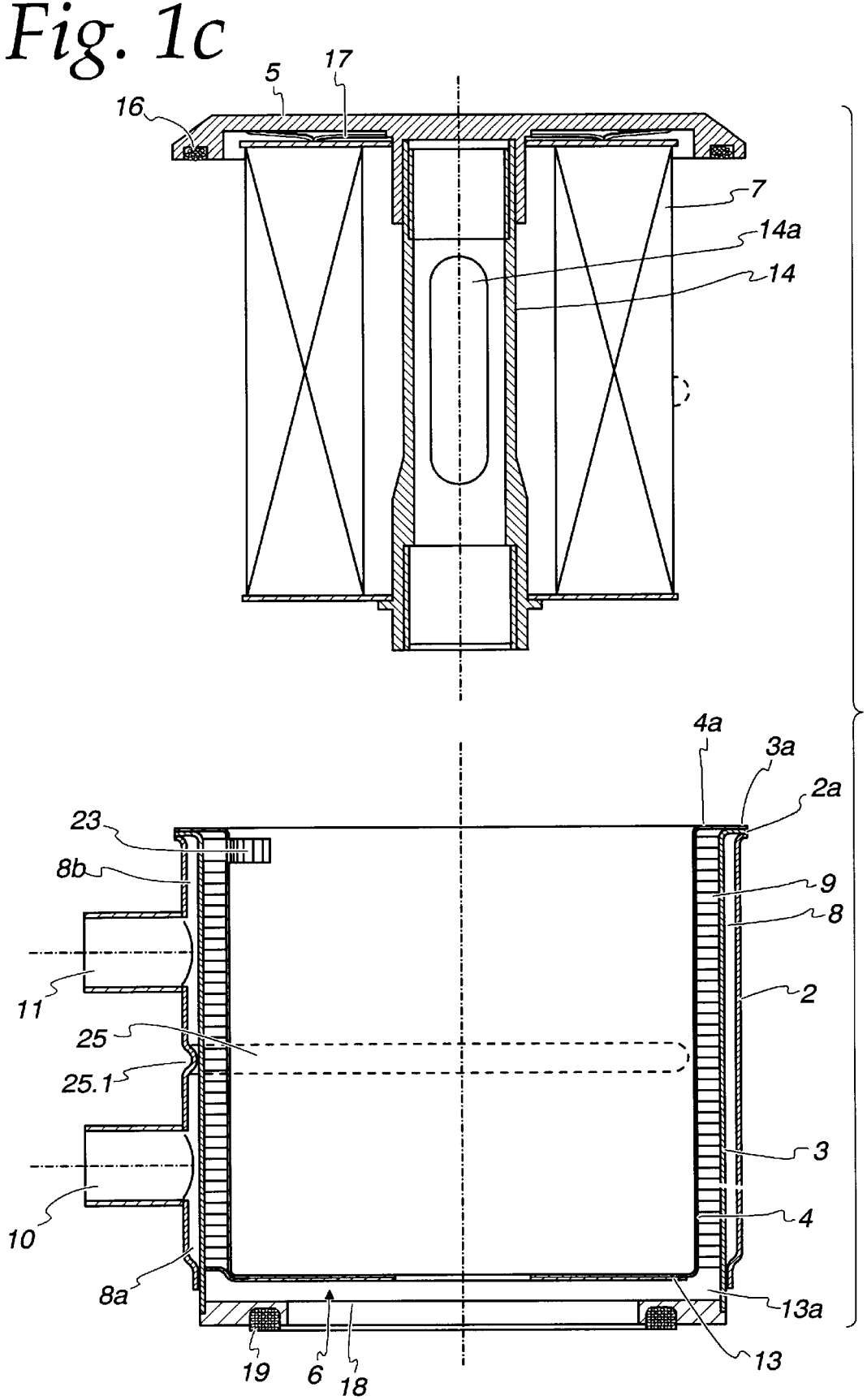

In the embodiment according to FIG. 1a the reservoir 1 comprises three concentric cups, which are inserted one inside another, flanges 2a, 3a and 4a arranged on the said cups bearing, tightly on one another, thereby forming the upper ends of the circulation chambers 8 and 9. The end 6 comprises the bottom of the innermost of the said cups combined with a baffle 13, which connects tightly against the intermediate wall but has a passage 13a, the extent and position of which will be seen from FIG. 3b.

The end 5 is detachably connected by means of a threaded connection to one end of the pipe 14, which extends axially in the housing 1 and which at its other end is connected to a socket 15 by means of a threaded connection. The said socket is supported by means of a shoulder 15a against the end 6. The pipe 14 serves in this embodiment as collecting pipe for filtered oil and for this purpose has at least one opening 14a in the pipe wall. Between the end 5 and the flange 4a there is a seal 16 and a disc spring 17, functionally connected to the end 5, is intended, when the end 5 is fitted, to press the filter material 7 down, that is against the shoulder 15a on the socket 15.

The oil filter according to the embodiment hitherto described is intended to be screwed fast on an internal combustion engine, the socket 15 being connected to a line (not shown) for filtered oil, and contaminated oil from the engine is fed to the filter through a duct 18, which is defined by a seal 19 and the socket 15. In the oil circulation chamber 9 there is a finned surface-enlarging element 20 for the oil, the function of which is to improve the heat transfer from the oil to the coolant. The surface enlarging element 20 may be an offset strip fin extended surface. The fins here are directed radially and the oil flow has been arranged so that in an area around the oil inlet and outlet openings in the circulation chamber 9 the flow is essentially parallel to the fins, whereas outside this area the direction of the flow is across the fins, thereby improving the heat transfer through flow turbulence.

The oil flow through the circulation chamber 9 of this embodiment will now be explained with reference to FIGS. 3a, 3b. The oil, as indicated by arrows 21, enters the circulation chamber 9 via the passage 13a in the baffle 13 and flows upwards, at the same time being distributed peripherally, as shown by arrows 22. The oil finally leaves the circulation chamber 9 and, as indicated by an arrow 24, finally enters the inside 12 of the filter housing via an opening 23, which is situated diametrically and diagonally opposite the baffle passage 13a. Here the oil is distributed over she surface of the filter material 7 and, after passing through this is collected up in the center pipe 14 via its opening 14*a* and finally reaches the socket 15 for onward transport to the engine.

According to the invention the circulation chamber is divided by a partition wall 25 into two essentially equal sub-chambers 8*a*, 8*b*, into which the openings 10 and 11 respectively open. In the partition wall 25 there is a passage 25*a* connecting the sub-chambers 8*a*, 8*b*, the passage being situated equidistant from the mouths of the inlet and outlet openings 10, 11 in each of the sub-chambers 8*a*, 8*b* respectively, in order to obtain a symmetrical coolant flow in the circulation chamber 8. In the embodiment of the invention hitherto described the openings are located approximately symmetrically on a generatrix of the outer wall 2 of the circulation chamber 8, and the partition wall 25 is arranged transversely to the generatrix and between the openings 10, 11. The passage 25*a* is arranged diametrically opposite the generatrix.

Figure 4A:
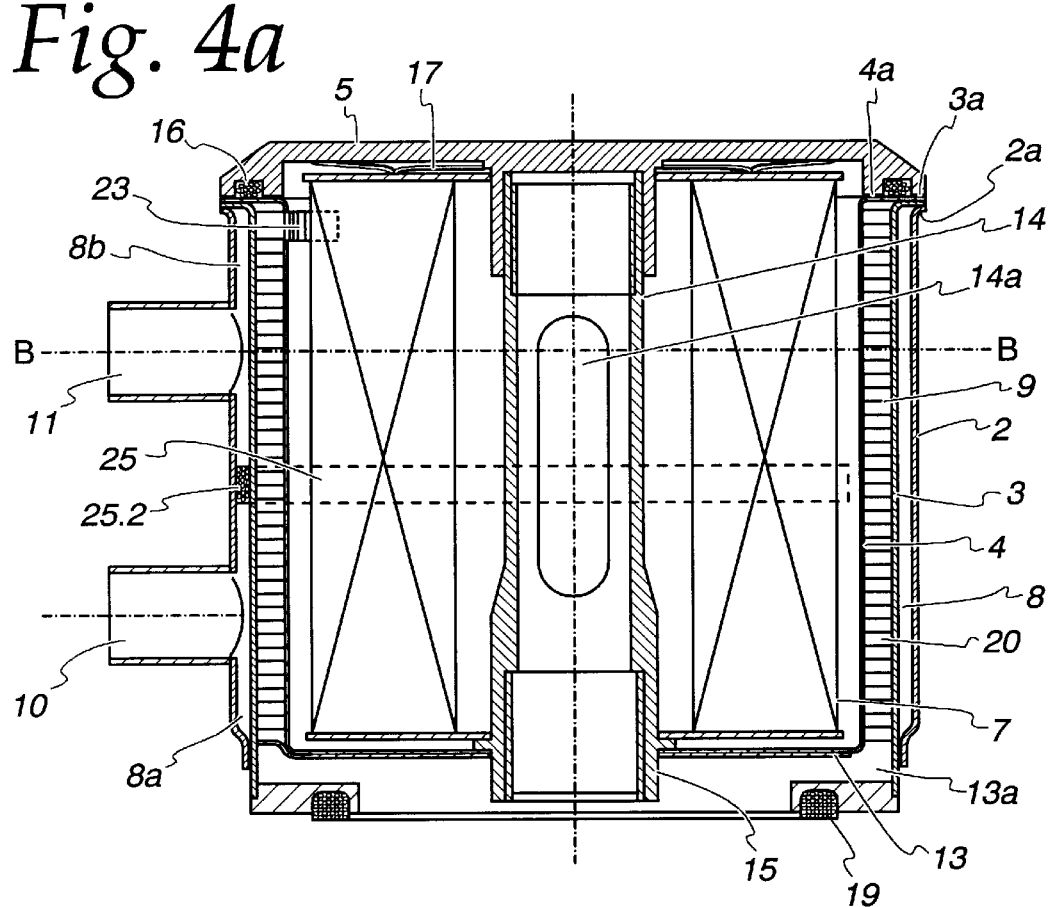
Figure 4B:
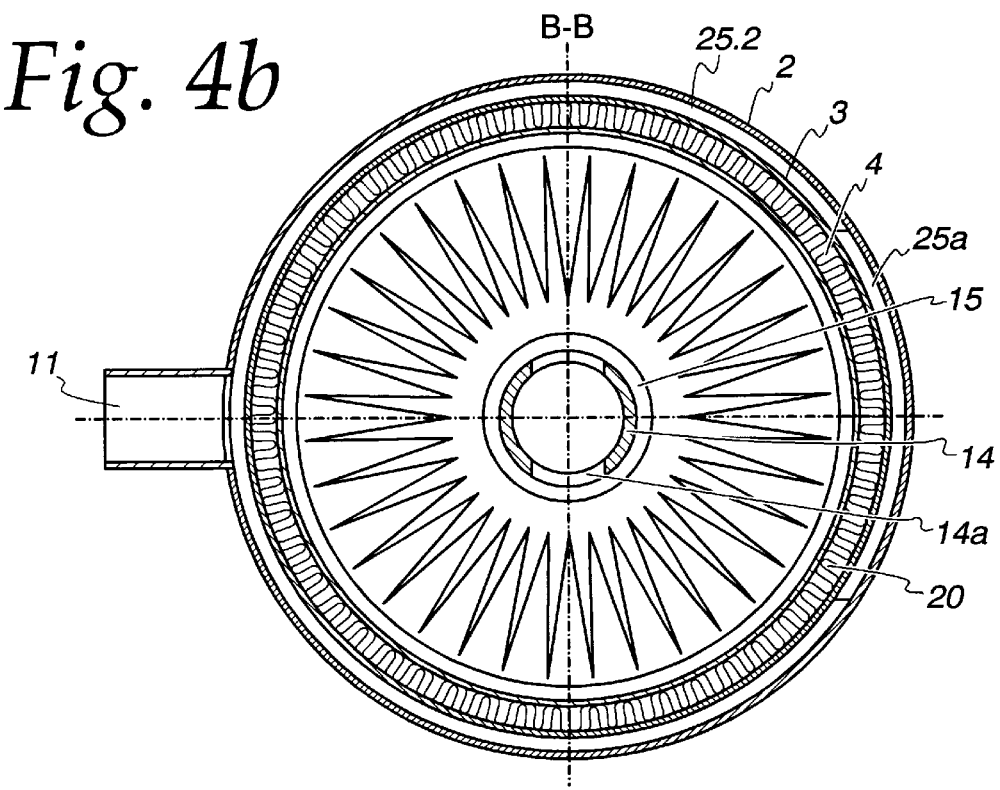

In the embodiment according to FIG. 1*a* the partition wall 25 is formed by a bead 25.1 made in the outer wall, the bead connecting tightly against the circulation chamber tall 3. The partition wall 25, as shown in FIG. 4*a*, can also be a slit profiled ring 25.2, which is designed to form a seal between the walls 2, 3 of the circulation chamber 8. The slit in the ring 25.2 at the same time forms the passage 25*a*.

Figure 5:
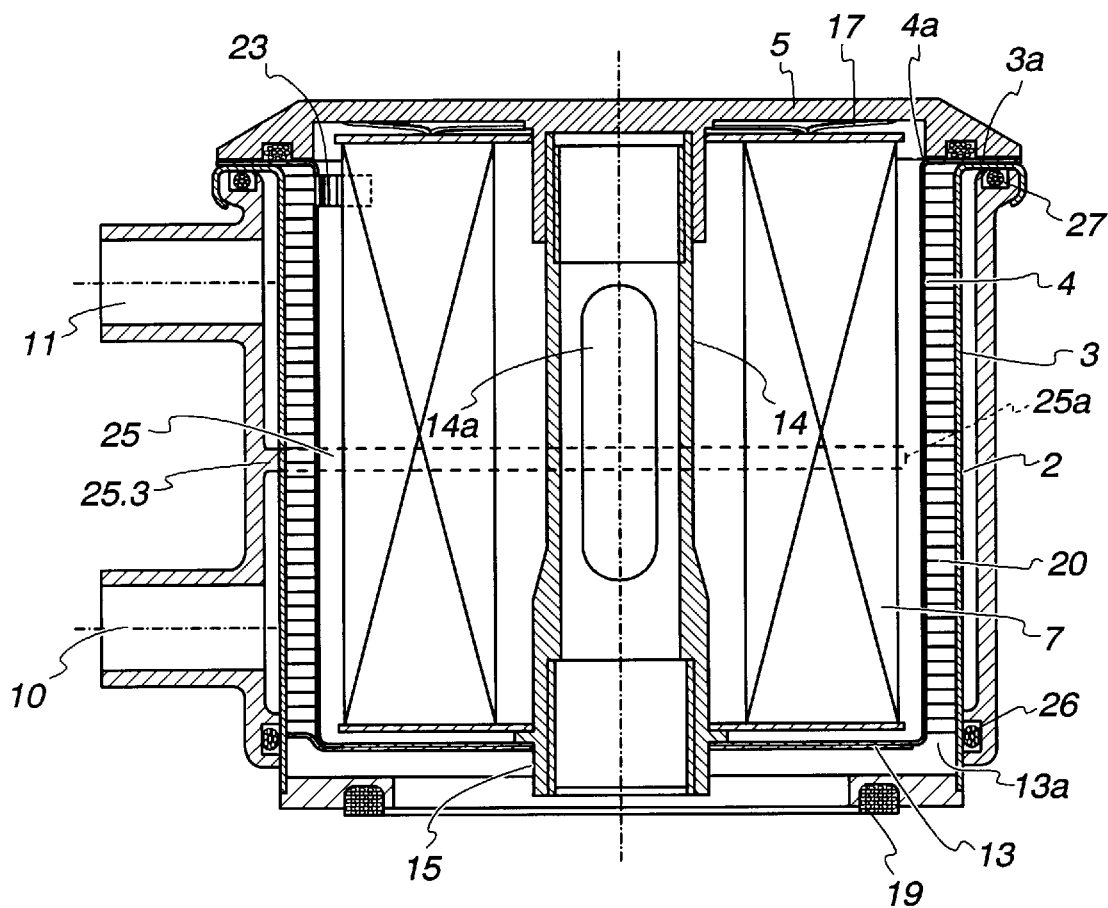
FIG. 5 shows in longitudinal section an alternative embodiment of the arrangement according to the invention.

In the embodiment according to FIG. 5 the annular chamber wall 2 is manufactured from plastic or metal by casting and the partition wall 25 here has a cast inwardly directed flange 25.3 which, in a corresponding way to the bead 25.1 or the slit ring 25.2, forms a seal against the flow chamber wall 3 and forms the passage 25*a*. Making the wall 2 by casting results in certain design differences compared to the embodiment previously explained, such as a lower and upper sealing ring 26 and 27 between the walls 2 and 3, for example and the fact that the flange 3*a* is extended and turned over the upper edge of the wall 2.

Figure 2A:
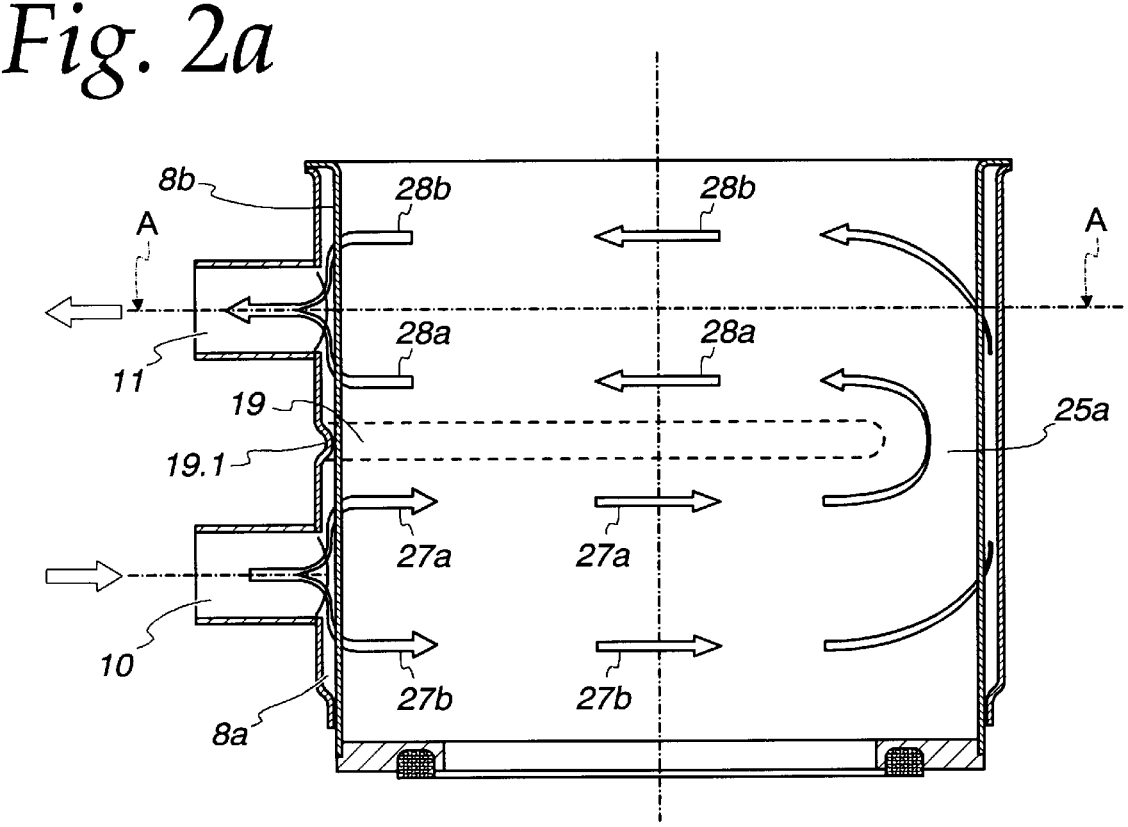
FIGS. 2a, 2b illustrate in diagrammatic form the coolant flow through the oil cooler part in a longitudinal and a cross-section A—A respectively.
Figure 2B:
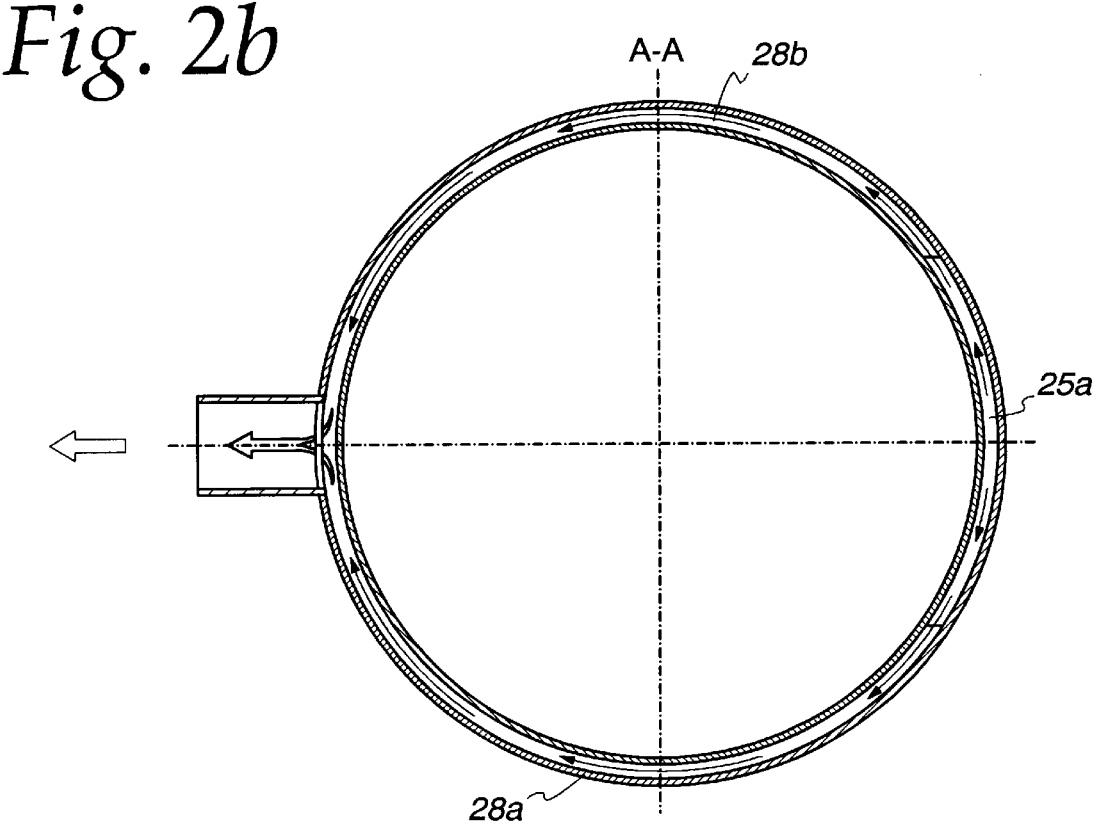

The flow of coolant in the circulation chamber 8 will now be explained with reference to FIGS. 2*a*, 2*b*. The coolant enters the sub-chamber 8*a* via the opening 10, which in this embodiment is a connecting piece for a coolant line, where the flow is divided up into clockwise and anticlockwise flows, indicated in FIG. 2*a* by arrows 27*a* and 27*b* respectively. The flows 27*a*, 27*b*, which together flow over the entire inner wall 3 of the sub-chamber 8*a*, flow through the passage 25*a* and enter the sub-chamber 8*b*, where in the form of clockwise and anticlockwise flows, marked by arrows 28*a*, 28*b*, they flow over the entire inner wall 3 of the sub-chamber 8*b* and are finally collected at the outlet opening 11. By means of the partition wall 25 and the passage 25*a* which, of course, lie diametrically opposite the inlet and outlet openings, an effective flow of coolant over the wall 3 and hence a similarly effective exchange of heat between the coolant and the oil are achieved, the oil being cooled as it flows through the chamber 9.

Figure 6A:
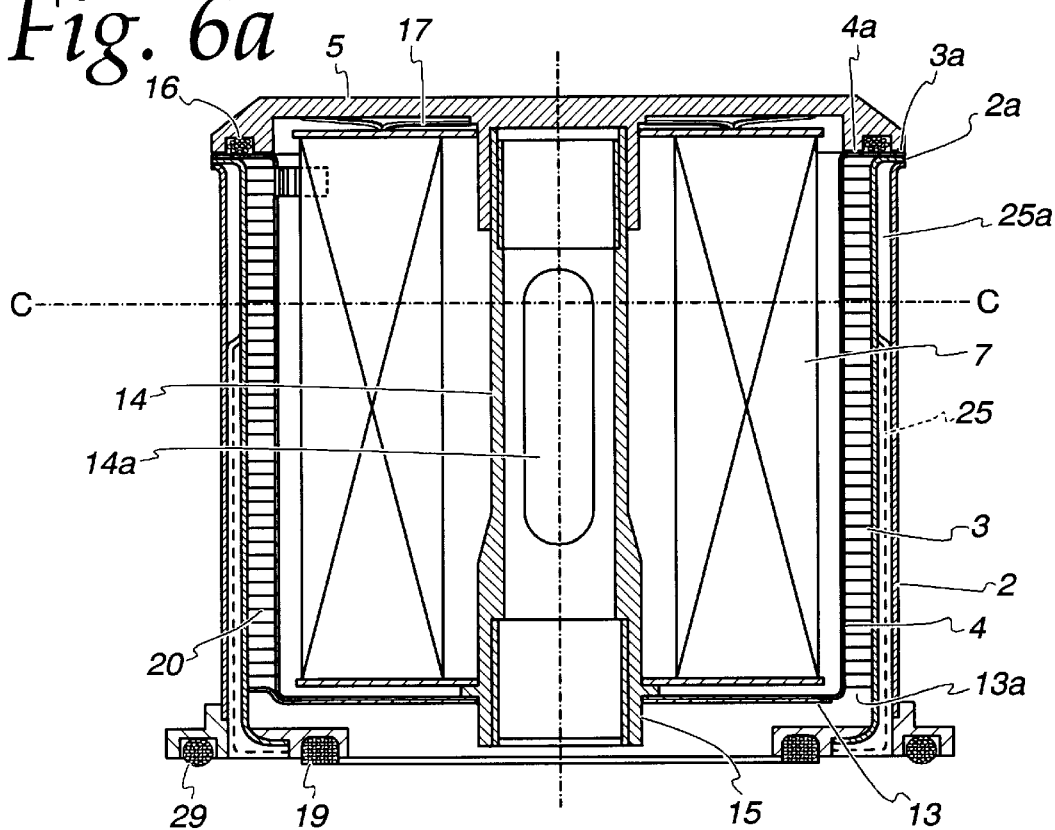
FIGS. 6a, 6b and 7a, 7b show, in longitudinal section and in cross section C—C and D—D respectively, alternative embodiments of the oil filter with integral oil cooler according to the invention.
Figure 6B:
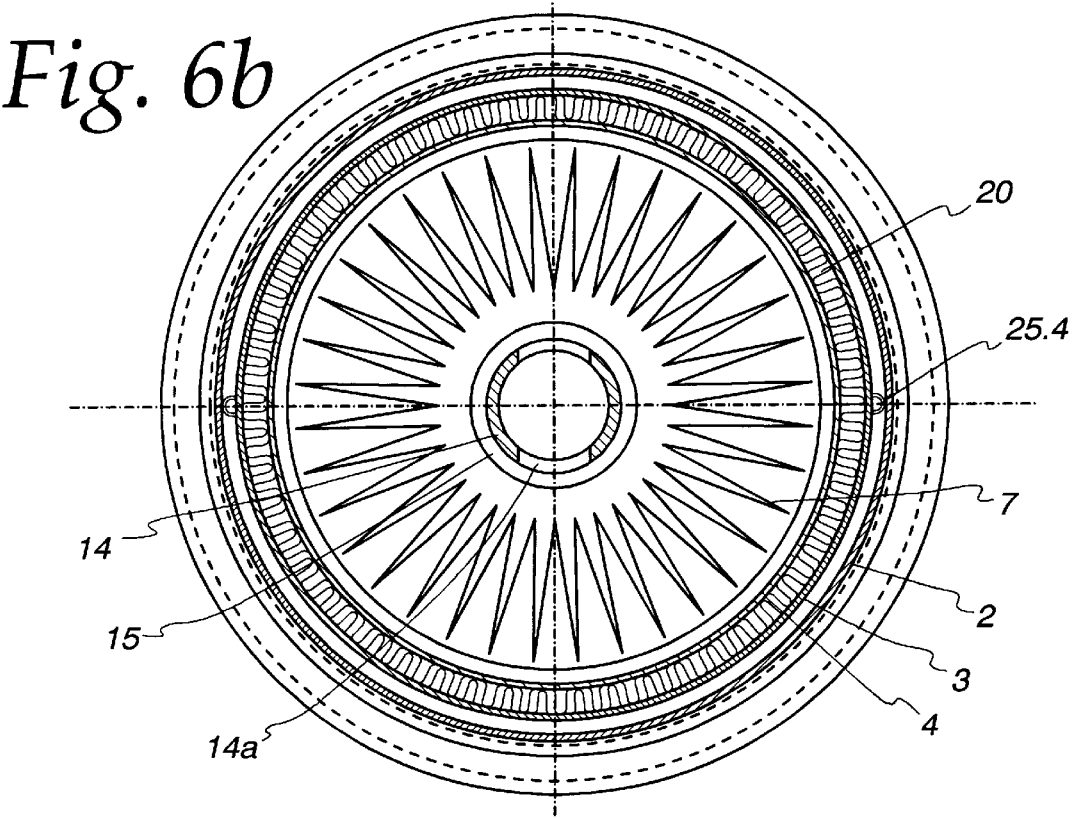
Figure 7A:
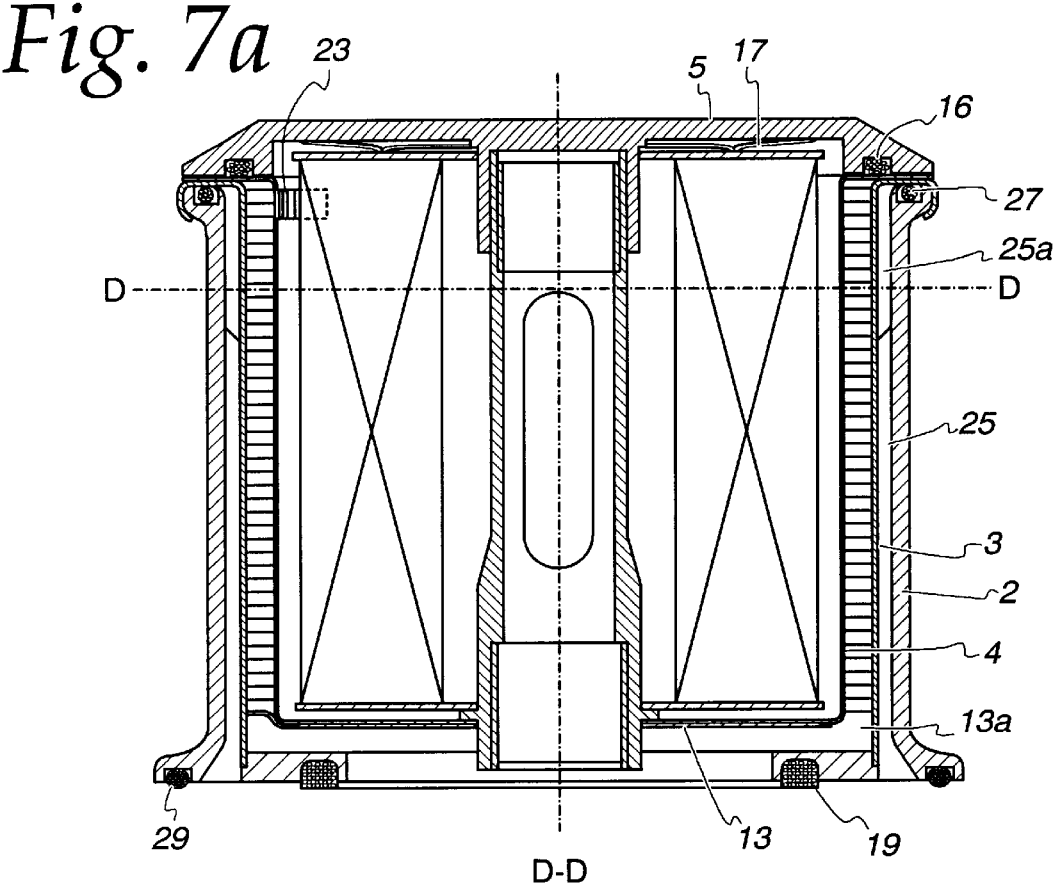
Figure 7B:
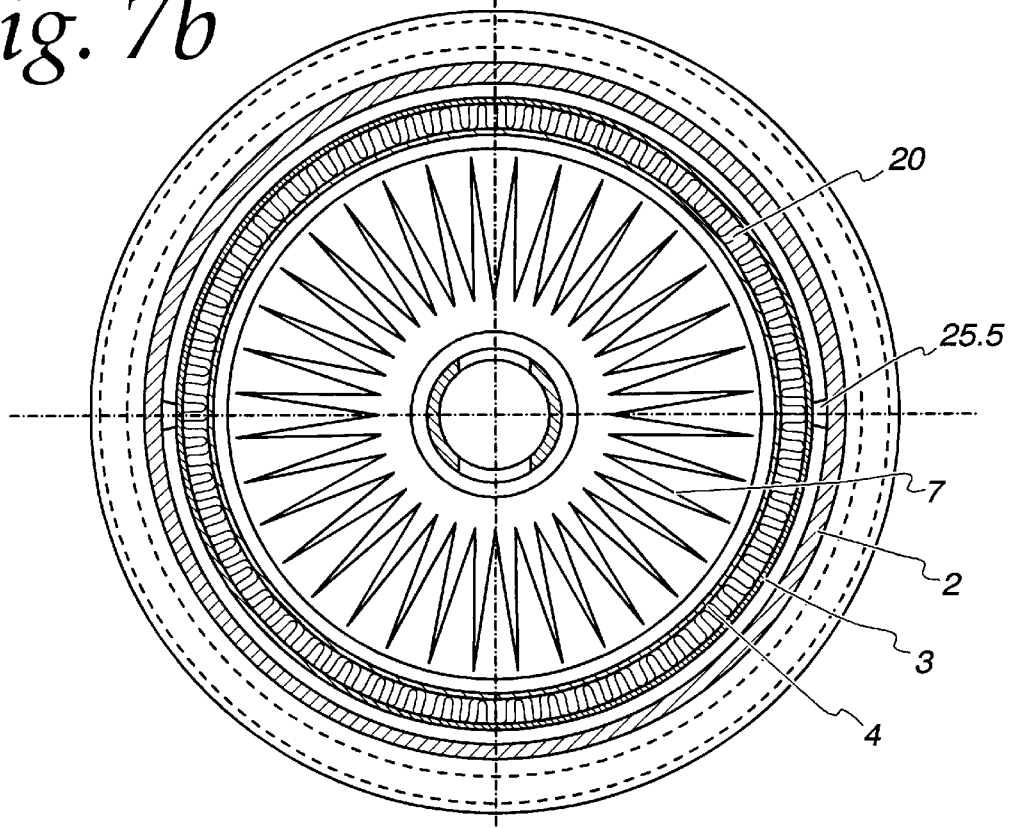

FIGS. 6*a* and 7*a* show additional embodiments of the present invention. The essential difference between these embodiments and the embodiments described above is that the partition wall 25 is oriented along two diametrically located generatrices. In the embodiment shown in FIG. 6*a* the partition wall 25 is arranged on the inner wall 3 of the outer circulation chamber 8 and in the embodiment according to FIG. 7*a* on the outer wall 2 of the circulation chamber 8. Consequently the coolant inlet and outlet openings 10, 11 are arranged at the lower end of the outer circulation chamber 8 in a plane oriented transversely to a plane through the partition wall 25. In order to define the inlet and outlet openings 10, 11, which in figures 6*a* and 7*a* lie in front of or behind the plane of the drawings respectively, the sealing ring 19 is used together with a sealing ring 29 located concentrically in front of this. In die embodiment shown in FIG. 6*a* the partition wall 25 takes the form of two diametrically opposed beads 25.4 in the intermediate wall 3. The beads 25.4 connect tightly against the outer wall 2. Naturally the intermediate wall as in the embodiment according to FIG. 4*a*, may be straight profile sections introduced into the chamber 8 and located in positions corresponding to the beads 25.4 in FIG. 6. FIG. 7 shows a cast plastic or metal outer wall 2. The partition wall 25 here comprises flanges 25.5 on the inside of the outer wall 2, which connect to the intermediate wall 3.

Although this is not shown on the drawing, it will be seen that in the embodiments according to FIGS. 6*a* and 7*a* the coolant flows upwards from the inlet opening and sideways into the associated sub-chamber, on via the passage 25*a* and down to the outlet opening. In these embodiments, in which the coolant is fed to the coolant circulation chamber 8 without external lines, a flow pattern is also obtained which effectively covers the heat-transferring wall 3. As is readily apparent, the filter of FIGS. 6 and 7 is used with an engine adapted to provide cooling fluid as well as oil to the bottom of the filter.

Figure 3A:
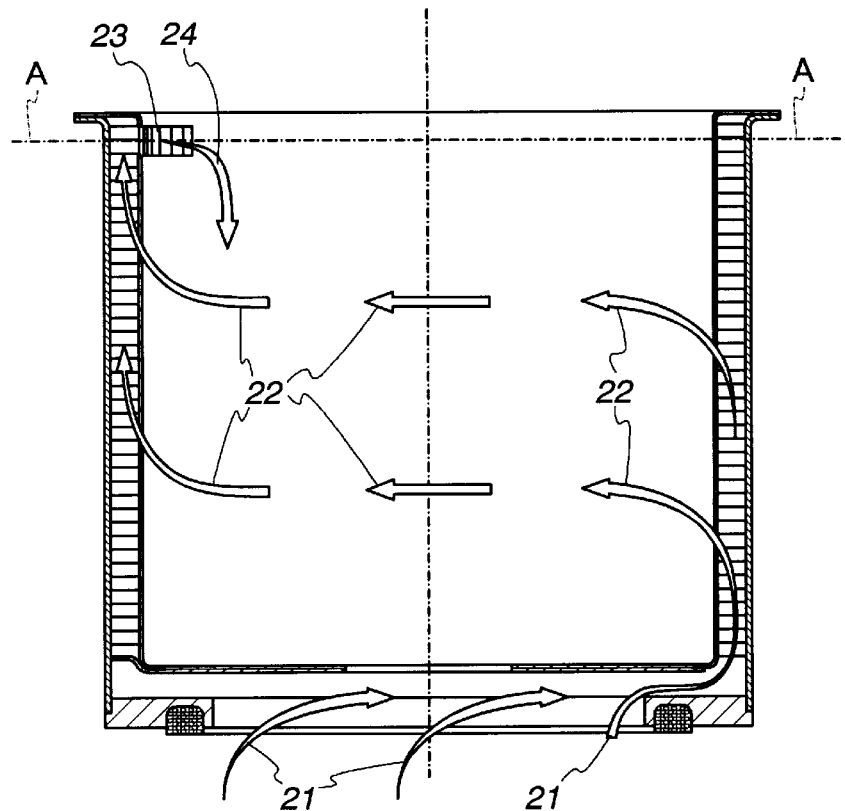
FIGS. 3a, 3b, in the same way as FIGS. 2a, 2b, illustrate the flow of oil through the oil cooler part.
Figure 3B:
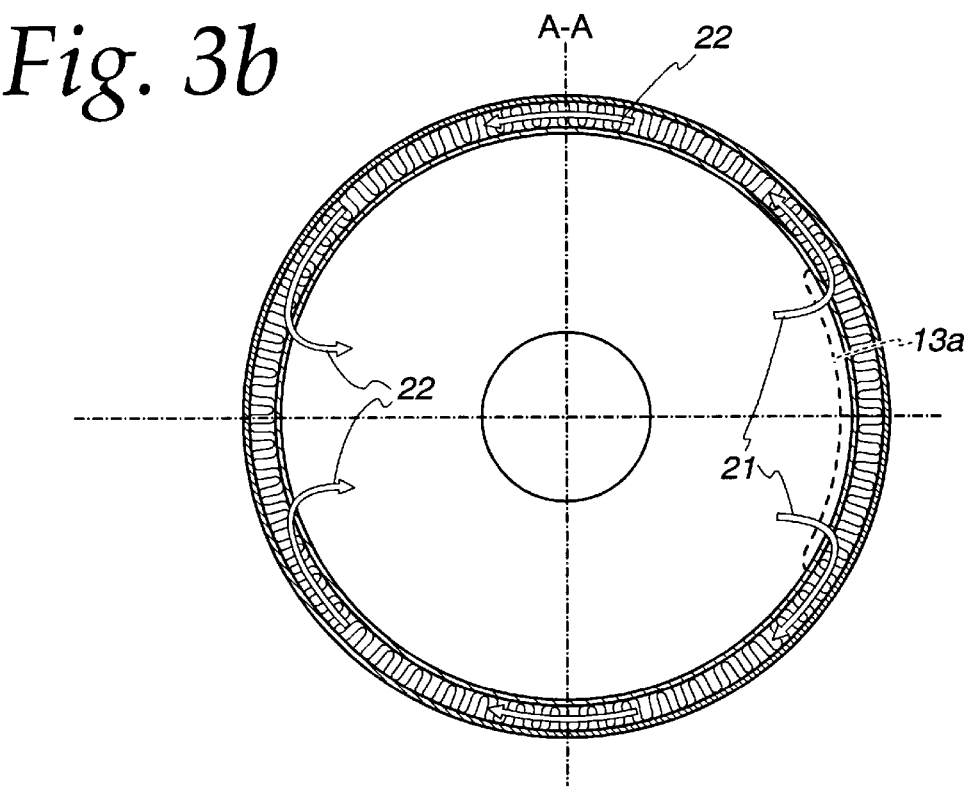
Figure 8A:
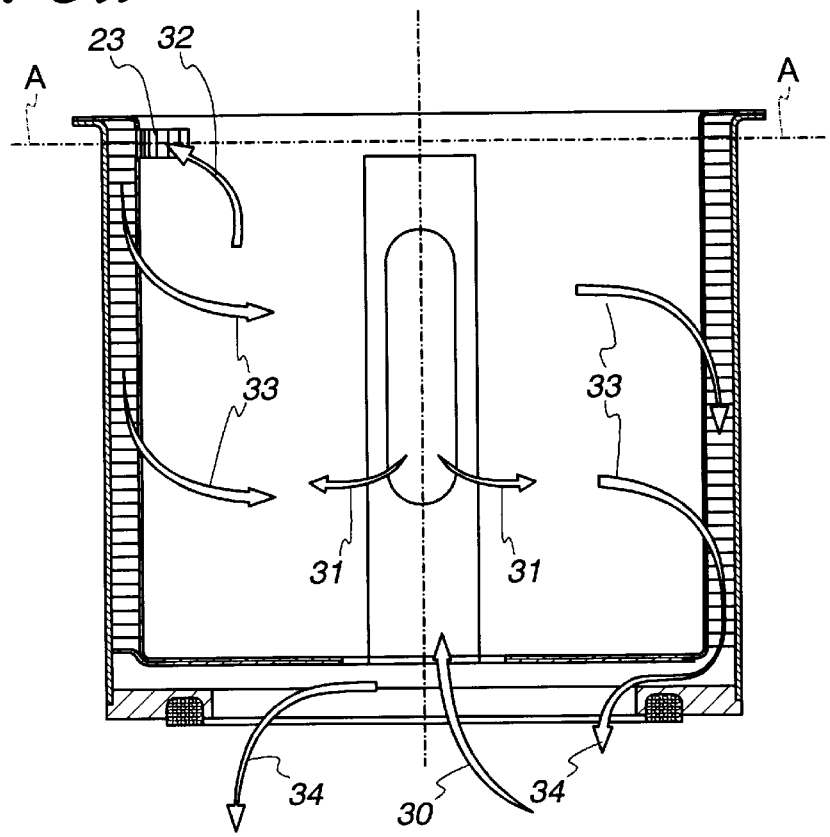
FIGS. 8a and 8b show an arrangement for the flow of oil which is an alternative to that shown in FIGS. 3a and 3b.
Figure 8B:
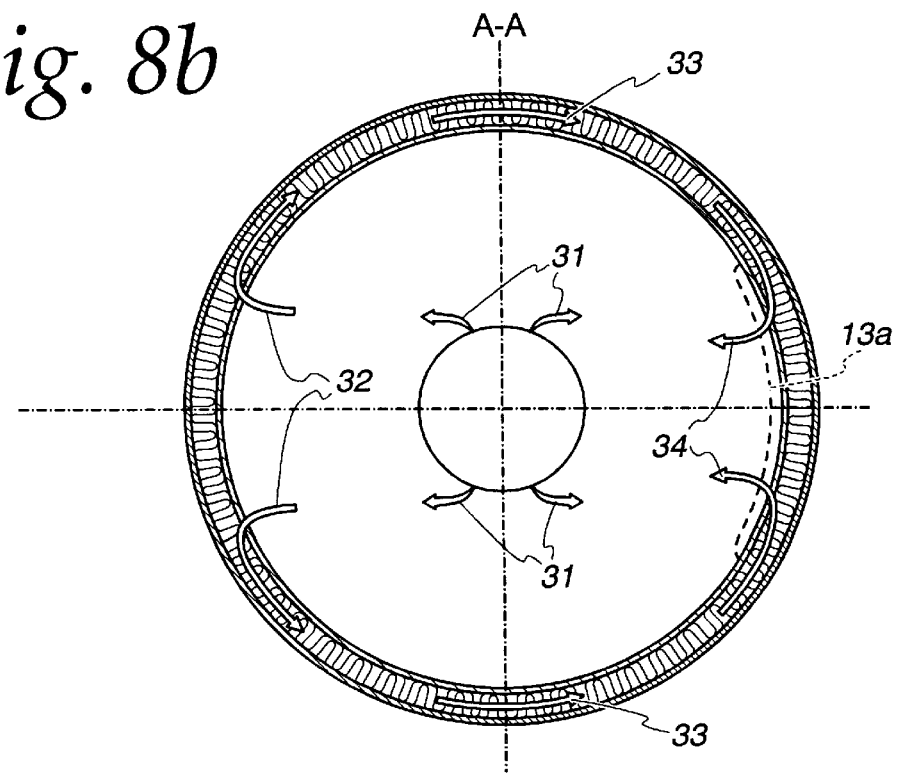

FIGS. 3*a* and 3*b* show a direction of oil flow which is the standard for existing internal combustion engines. FIGS. 8*a* and 8*b* show an alternative to FIGS. 3*a* and 3*b* in which oil flows through the filter material 7 before flowing through the circulation chamber 9. In FIGS. 8*a* and 8*b* oil enters 30 center pipe 14 and flows 31 into the filter material 7. Oil exits 32 the filter material via opening 23 and circulates 33 through circulation chamber 9. Oil exits the circulation chamber via opening 13*a* and passes 34 from the filter. The example of FIGS. 8*a* and 8*b* provides advantages by introducing filtered oil into the circulation chamber which may keep impurities from accumulating therein. Such reversed direction of oil flow is preferred with the embodiments of FIGS. 6 and 7.

I claim:

1. An oil filter having an integral oil cooler, said oil filter comprising:

a filter material in the form of a tubular casing, said filter material being enclosed in a housing defined by a cylindrical wall and two opposing ends, one of said ends being capable of being opened for changing said filter material;

an inner annular circulation chamber for accommodating oil flow therein;

an outer annular circulation chamber for accommodating coolant flow therein, said outer chamber being essentially concentric with said inner chamber, both said chambers being arranged in front of said cylindrical wall; and a partition wall for dividing said outer chamber into first and second essentially equal subchambers, said first subchamber having an inlet opening and second subchamber having an outlet opening, said partition wall having a passage therethrough for connecting said first and second subchambers wherein said passage is situated equidistantly from said inlet and outlet openings in order to obtain a symmetrical flow of coolant in said outer circulation chamber;

wherein said housing and said circulation chambers are defined by three concentric reservoirs inserted one inside another, said reservoirs having flanges tightly abutting one another when said reservoirs are inserted one inside another to define an upper wall for each of said circulation chambers.

2. An oil filter in accordance with claim 1 wherein a profile ring, profile sections, and the walls of said outer circulation chamber are joint-connected and said flanges are also joint-connected.

3. An oil filter having an integral oil cooler, said oil filter comprising:

a filter material in the form of a tubular casing, said filter material being enclosed in a housing defined by a cylindrical wall and two opposing ends, one of said ends being capable of being opened for changing said filter material;

an inner annular circulation chamber for accommodating oil flow therein;

an outer annular circulation chamber for accommodating coolant flow therein, said outer chamber being essentially concentric with said inner chamber, both said chambers being arranged in front of said cylindrical wall; and a partition wall for dividing said outer chamber into first and second essentially equal subchambers, said first subchamber having an inlet opening and second subchamber having an outlet opening, said partition wall having a passage therethrough for connecting said first and second subchambers wherein said passage is situated equidistantly from said inlet and outlet openings in order to obtain a symmetrical flow of coolant in said outer circulation chamber;

said inner chamber including an inlet passage and an outlet passage wherein said outlet passage is disposed at the opposite end of said housing from said inlet passage and said passages are also diametrically opposed.

4. An oil filter in accordance with claim 3 wherein said inlet passage is at a lower end of said inner circulation chamber and said outlet passage is at an upper end of said inner circulation chamber.

5. An oil filter in accordance with claim 3 further including finned surface-enlarging elements within said inner circulation chamber for producing an improved heat exchange between said oil and said coolant.

6. An oil filter in accordance with claim 5 wherein said oil flow is parallel to said finned elements proximate said inlet and outlet openings and is transverse to said finned elements remote from said inlet and outlet openings.

7. An oil filter having an integral oil cooler, said oil filter comprising:

a filter material in the form of a tubular casing, said filter material being enclosed in a housing defined by a cylindrical wall and two opposing ends, one of said ends being capable of being opened for changing said filter material;

an inner annular circulation chamber for accommodating oil flow therein;

an outer annular circulation chamber for accommodating coolant flow therein, said outer chamber being essentially concentric with said inner chamber, both said chambers being arranged in front of said cylindrical wall; and a partition wall for dividing said outer chamber into first and second essentially equal subchambers, said first subchamber having an inlet opening and second subchamber having an outlet opening, said partition wall having a passage therethrough for connecting said first and second subchambers wherein said passage is situated equidistantly from said inlet and outlet openings in order to obtain a symmetrical flow of coolant in said outer circulation chamber;

said oil flow encountering said filter material prior to flowing into said inner circulation chamber.

8. An oil filter in accordance with claim 7 wherein said flow encounters said filter material after flowing through a central pipe running axially therethrough.

9. An oil filter in accordance with claim 7 further including finned surface-enlarging elements within said inner circulation chamber for producing an improved heat exchange between said oil and said coolant.

10. An oil filter in accordance with claim 7 wherein said oil flow is parallel to said finned elements proximate said inlet and outlet openings and is transverse to said finned elements remote from said inlet and outlet openings.

* * * * *